United States Patent
Nanda

[19]

[11] Patent Number: 5,857,701
[45] Date of Patent: Jan. 12, 1999

[54] PASSENGER RESTRAINT SYSTEM

[76] Inventor: Ken K. S. Nanda, 23115 Beck Rd., Novi, Mich. 48374

[21] Appl. No.: 856,437

[22] Filed: May 14, 1997

[51] Int. Cl.$^6$ .................................................... B60R 21/06
[52] U.S. Cl. .......................... 280/749; 296/35.2; 297/487
[58] Field of Search ................................... 280/749, 753; 296/35.2; 297/487; 180/274

[56] References Cited

U.S. PATENT DOCUMENTS

| 3,037,809 | 6/1962 | Praha | 280/749 |
| 3,692,327 | 9/1972 | Barrick, Sr. et al. | 280/749 |
| 3,814,459 | 6/1974 | Eckels | 280/753 |
| 4,043,582 | 8/1977 | Lyter | 280/749 |
| 4,635,962 | 1/1987 | Miyada | 280/749 |
| 5,226,672 | 7/1993 | Husted | 280/749 |
| 5,375,879 | 12/1994 | Williams et al. | 280/749 |
| 5,505,485 | 4/1996 | Breed | 280/729 |
| 5,536,042 | 7/1996 | Williams et al. | 280/749 |
| 5,547,219 | 8/1996 | Ha | 280/749 |
| 5,660,414 | 8/1997 | Karlow et al. | 286/749 |

FOREIGN PATENT DOCUMENTS 2229261  12/1973  Germany ................................ 280/749

Primary Examiner—Christopher P. Ellis
Attorney, Agent, or Firm—Brooks & Kushman P.C.

[57] ABSTRACT

A protection system providing a crash barrier for an occupant of a vehicle having a header when the vehicle is subjected to an impact force. The protection system comprises a pair of expandable bellows, a latch, a crash barrier, a sensor, and an expander responsive to operation of the sensor. The pair of spaced expandable bellows are adapted to be in a normally retracted stored relationship to the header of the vehicle. Each bellows has a first end affixed with respect to the vehicle on one side of the occupant and a second end expandably deployable to an opposite side of the occupant. The latch is adapted to be affixed with respect to the vehicle at the opposite side of the occupant to latchingly receive the second end of each bellows. The crash barrier has one portion adapted to be affixed with respect to the vehicle on the one side of the occupant and another portion attached to the second end of each bellows. The crash barrier is deployable with the second end of each bellows to the opposite side of the occupant. The sensor operates to sense when the vehicle is subjected to a high impact force and expands the bellows to deploy the crash barrier.

20 Claims, 4 Drawing Sheets

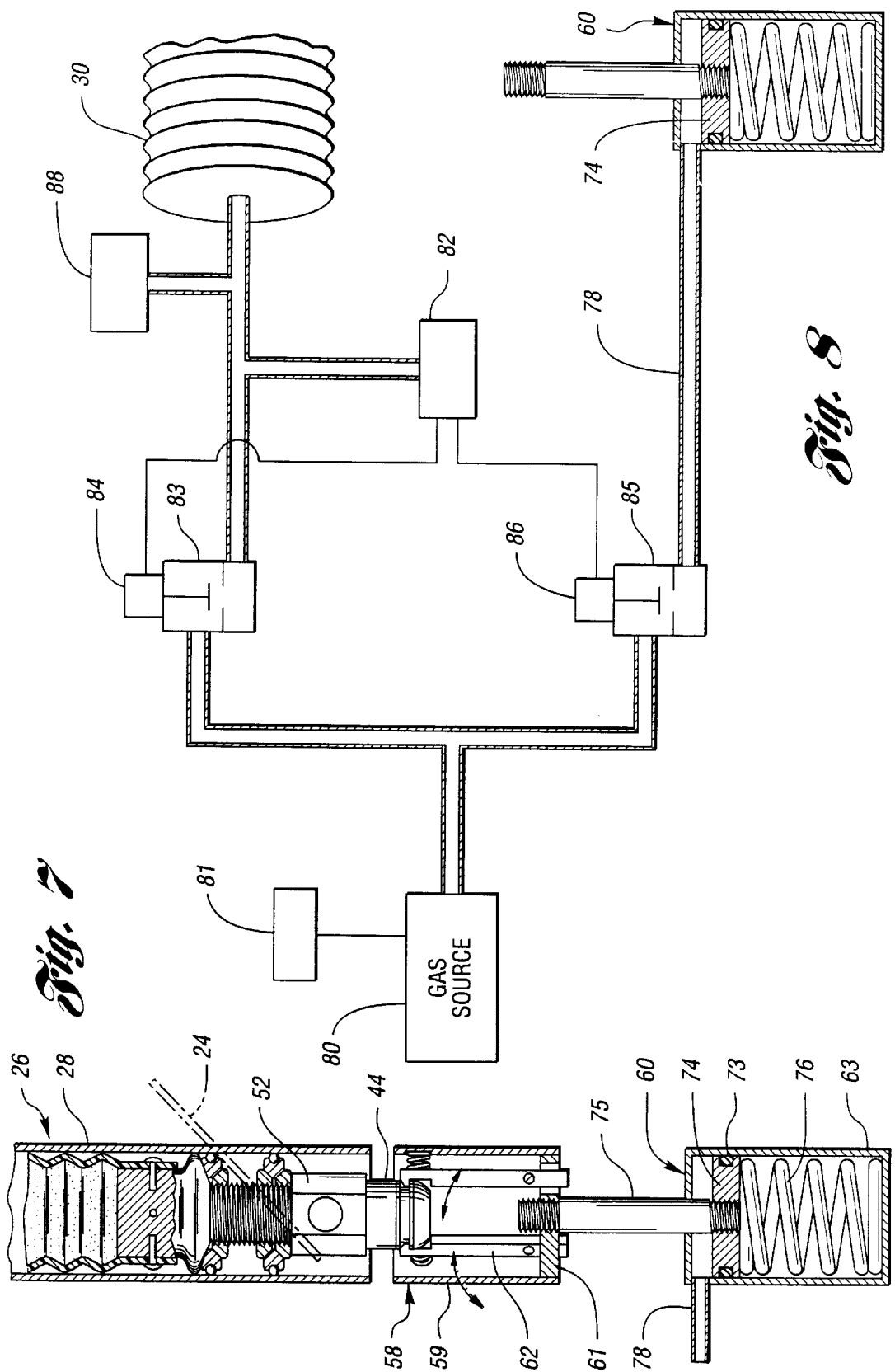

5,857,701

PASSENGER RESTRAINT SYSTEM

TECHNICAL FIELD

This invention relates to a passenger restraint system for a vehicle.

BACKGROUND ART

Passenger restraint systems are designed to reduce the risk of serious injury or death to a passenger involved in a vehicular accident. Three types of passenger restraint systems, including seat belts, air bags, and web restraints, are found in the prior art.

For many years, conventional seat belts have been installed in vehicles. When used properly, seat belts have proven to reduce the risk of serious injury or death resulting from a vehicular crash. However, conventional seat belts have several shortcomings. First, a seat belt is an active restraint system requiring that the passenger buckle the belt each time the passenger enters the vehicle. Second, conventional seat belts often do not properly fit passengers such as short adults and children. During a crash, an improperly worn seat belt may cause serious injury or death. Third, seat belts alone do not provide passengers with the maximum amount of protection available. The risk of serious injury or death resulting from a vehicular crash is further reduced when a seat belt is used in conjunction with a passive restraint system such as an air bag.

Recently, air bag systems have been installed in vehicles. Conventional air bag systems protect front seat passengers by deploying a bag filled with pressurized gas during front or side impact collisions. Conventional air bag systems, in cooperation with a seat belt system, further reduce the risk of serious injury or death during a vehicular crash. Nevertheless, such air bag systems also have shortcomings. Crash reports indicate that short adults and children are especially prone to injury from air bag deployment. Further, after deployment of the air bag during a first impact, the air bag deflates and can not protect the passenger during a second consecutive impact. Additionally, conventional air bags do not provide protection to passengers seated in the rear of the vehicle.

A third type of passenger restraint system is disclosed in U.S. Pat. No. 5,226,672 issued on Jul. 13, 1993 to Husted. During a crash, this restraint system traps the upper body of the occupant within a web. While this system claims advantages over conventional air bag systems, it also has several shortcomings. For one, the webbed surface of the webbing may cause injuries to the passenger during and after deployment.

SUMMARY OF THE INVENTION

An object of the present invention is to provide a passenger restraint system for protecting an occupant of a vehicle.

In carrying out the above object, and other objects and features of the present invention, an improved protection system is provided. The protection system provides a crash barrier for an occupant of a vehicle when the vehicle is subjected to an impact force. The protection system comprises a pair of expandable bellows, a latch, a crash barrier, a sensor, and an expander responsive to operation of the sensor. The pair of spaced expandable bellows are adapted to be stored in a normally retracted relationship to a header of the vehicle. Each bellows has a first end affixed with respect to the vehicle on one side of the occupant and a second end expandably deployable to an opposite side of the occupant. The latch is adapted to be affixed with respect to the vehicle at the opposite side of the occupant to receive and latch the second end of at least one of the bellows. The crash barrier has one portion adapted to be affixed with respect to the vehicle on the one side of the occupant and another portion attached to the second end of each bellows. The crash barrier is deployable with the second end of each bellows to the opposite side of the occupant. The sensor operates to sense when the vehicle is subjected to a high impact force. The expander is responsive to operation of the sensor to expand the bellows from the normally retracted relationship to deploy the second end of each bellows to the opposite side of the occupant and thereby deploy the crash barrier between the occupant and an impact force.

In a more specific embodiment, the protection system as described may include a guide assembly for each of the expandable bellows. Such a guide assembly may include a guide tube. Furthermore, each of the expandable bellows may be positioned within a respective guide assembly. In such case, the guide assembly may include a guide slot to provide access for attaching the crash barrier to the second end of a respective bellows and to guide the second end of the respective bellows from the normally retracted stored relationship to the opposite side of the occupant.

In another more specific embodiment, the expander responsive to operation of the sensor for expanding the bellows may include a pneumatic supply for filling the bellows with a gas and thereby forcing the second end of each bellows from the normally retracted stored relationship to the opposite side of the occupant when the sensor is operated.

In another more specific embodiment, the second end of each bellows may include a latch bolt which is attached to the crash barrier and which is latchable with the latch. In such case, the latch may include a keeper for receiving the latch bolt and a tautening device to tauten the crash barrier after the latch bolt has been received by the keeper. Such a tautening device may include a piston moveable for moving the keeper to tauten the crash barrier after the latch bolt has been received by the keeper. The latch may further include a pneumatic supply to move the piston. The tautening device may further include a spring for biasing the keeper toward the latch bolt.

In an alternative embodiment, the invention is a crash barrier for an occupant of a vehicle where the vehicle has a support structure and trim covering the support structure. The crash barrier protection system comprises a pair of expandable bellows, a latch, a crash barrier, a sensor means, and an expander responsive to operation of the sensor. The pair of expandable bellows are adapted to be in a normally retracted stored relationship to the header of the vehicle. Each bellows has a first end affixed with respect to the vehicle on one side of the occupant and a second end expandably deployable to an opposite side of the occupant. The latch is adapted to be affixed with respect to the vehicle at the opposite side of the occupant to receive latchingly the second end of at least one of the bellows. The crash barrier is normally concealed by the trim and has one portion affixed with respect to the support structure on the one side of the occupant and another portion attached to the second end of each bellows. The crash barrier is deployable with the second end of each bellows to the opposite side of the occupant. The sensor operates to sense when the vehicle is subjected to a high impact force. The expander responsive to operation of the sensor expands each bellows from its normally retracted stored relationship to deploy the second end of each bellows to the opposite side of the occupant and thereby deploy the crash barrier between the occupant and an impact force.

An advantage of the present invention is that it provides an improved passenger restraint system which reduces the risk of injury or death resulting from deployment of the system.

Another advantage of the present invention is that it provides a deployable crash barrier which during deployment does not impact the passenger.

Yet another advantages of the present invention is that it may be utilized to provide impact protection for passengers situated in the rear portion of a vehicle.

While an embodiment of this invention is illustrated and disclosed, this embodiment should not be construed to limit the claims. It is anticipated that various modifications and alternative designs may be made without departing from the scope of this invention.

BRIEF DESCRIPTION OF THE DRAWINGS

FIG. 7 is a cross-sectional elevational view of a guide assembly with a keeper tube assembly connected to a tautening device and showing the latch bolt and its keeper in a latched position to tauten the crash barrier after its deployment; and FIG. 8 is a schematic of a pneumatic system suitable for use with the restraint system of this invention.

BEST MODE FOR CARRYING OUT THE PRESENT INVENTION

Figure 1:
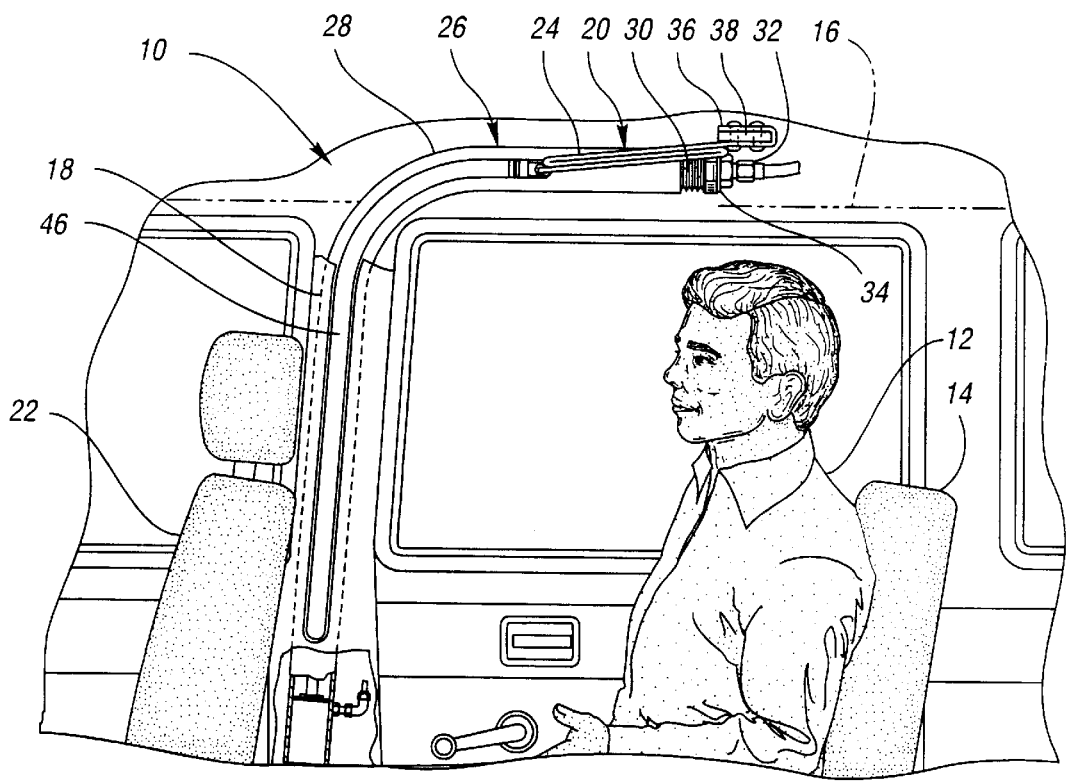
FIG. 1 is a cross-sectional elevational view of a vehicle with a passenger seated in a rear seat and with the headliner and trim partially broken away to show a restraint system of the present invention in a stored position prior to deployment.

FIG. 1 shows a cross-sectional view of a vehicle 10 with a passenger or occupant 12 seated in a rear seat 14. A headliner 16 and portions of interior trim 18 are broken away to show a restraint system 20 having a crash barrier 24 in accordance with the present invention. As shown in FIG. 1, the crash barrier 24 of the restraint system 20 is stored in a retracted position above headliner 16. When deployed, the crash barrier 24 of the restraint system 20 provides a crash barrier between passenger 12 and the back of front seat 22 as shown FIG. 5. One skilled in the art will recognize that restraint system 20 may also be installed within vehicle 10 so as to provide similar protection to a driver and front seat passengers.

As shown in FIG. 1, restraint system 20 is comprised of a pair of guide assemblies laterally spaced along each side of vehicle 10. Each of the guide assemblies is attached to a respective side of the crash barrier 24. Only one guide assembly 26 is shown in FIG. 1. The other guide assembly (not shown) is installed in like manner on the opposite side of vehicle 10. Each guide assembly is comprised of like components and operates in a like manner. Further discussion regarding guide assembly 26 is therefore also applicable the second guide assembly (not shown).

Figure 2:
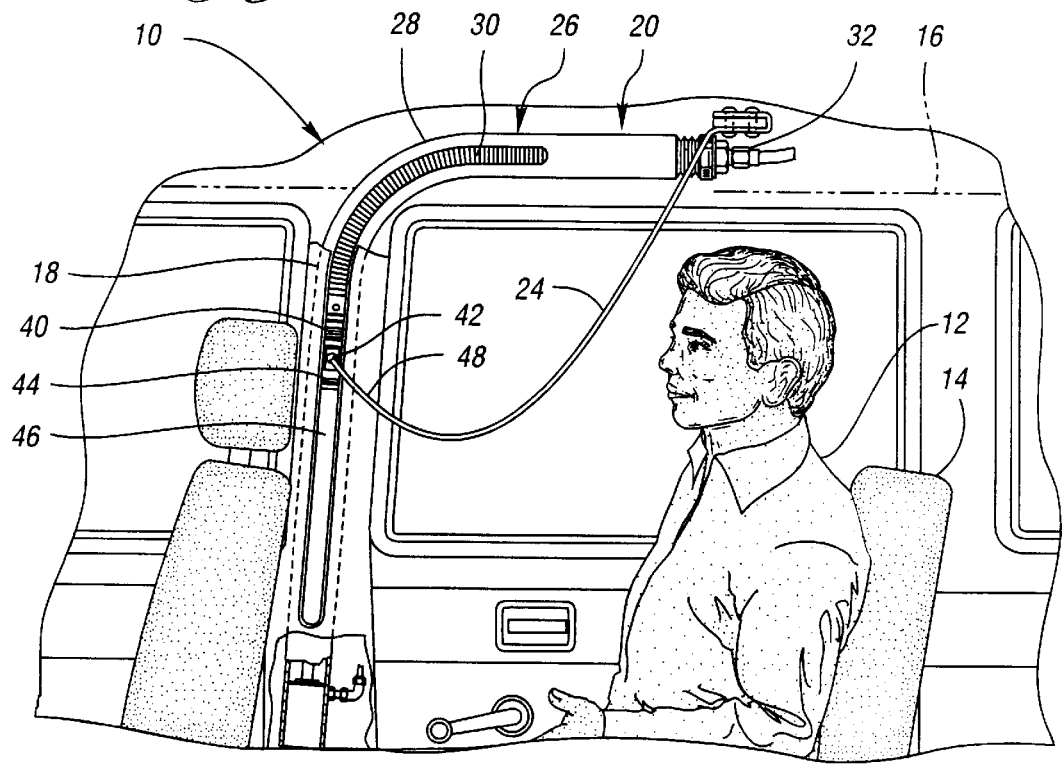
FIG. 2 is a cross-sectional elevational view of the vehicle shown in FIG. 1 with the restraint system shown in a partially deployed position.

Guide assembly 26 includes a guide tube 28 and an expandable bellows 30 best shown in FIG. 2. While any appropriately dimensioned components may be used, it is believed that a guide tube 28 having an inner diameter measuring two inches in diameter and an expandable bellows 30 measuring one and one-half inches in diameter would be suitable. In this embodiment, the guide tube 28 is routed horizontally above headliner 16 and vertically behind interior trim 18. The expandable bellows 30 is positioned within guide tube 28. While any suitable expandable bellows could be used, it is believed that Stretch N Flex part number 56385k-212 supplied by McMaster-Carr of Chicago, Ill. is suitable. While any suitable guide tube could be used, it is believed that a guide tube manufactured from standard automotive muffler tubing is suitable.

Referring to FIG. 1, a first pneumatic supply line 32 providing a gas, such as air, is connected to an end cap 34 of the bellows 30. While any suitable connection may be used, it is believed that a push-lock quick connection, as shown, would be suitable. The supply line 32 may be any suitable tubular material such as nylon. To prevent air leaks, end cap 34 may be attached to a first end 35 of bellows 30 with a hose clamp or with any other suitable connector device. Because such connectors are generally well known in the art, they will not be described in further detail here.

FIG. 1 shows the crash barrier 24 stored above the headliner 16 in a folded position. A first end 36 of crash barrier 24 is permanently fixed to an upper support 38 which is concealed behind and fixed with respect to the vehicle and its headliner. Any suitable connection may be used to fix the first end 36 to the upper support 38 such as rivets as shown. The crash barrier 24 itself may be formed of any suitable material such as stretchable nylon, polyester, or other energy absorbing material. In any event, it is preferable that the material used have a relatively smooth surface, as opposed to a large-opening mesh, to reduce abrasion injuries to the occupant when impacting the crash barrier 24.

FIG. 2 shows the crash barrier 24 of the restraint system 20 of FIG. 1 in a partially deployed position. When vehicle 10 is subjected to a high impact force, the bellows 30 is expanded with air from first supply line 32 thereby forcing a freely movable second end 40 of bellows 30 from the retracted position above headliner 16 to the partially deployed position. FIG. 4 shows the second end 40 of bellows 30. Bellows 30 is attached to a head 50 with locking pins 57. Such locking pins are well known in the art and will not be described in further detail here. Before attachment, sealant is preferably applied to prevent air leaks between bellows 30 and head 50. While any suitable sealant may be used, it is believed that silicon would be suitable. Preferably, the head 50 itself is made of aluminum. A mount 52 for latch bolt 44 extends from head 50 and has an internally threaded bore 51 at its end to receive a fastening device or bolt 92 of the latch bolt 44 shown in FIG. 3.

Figure 3:
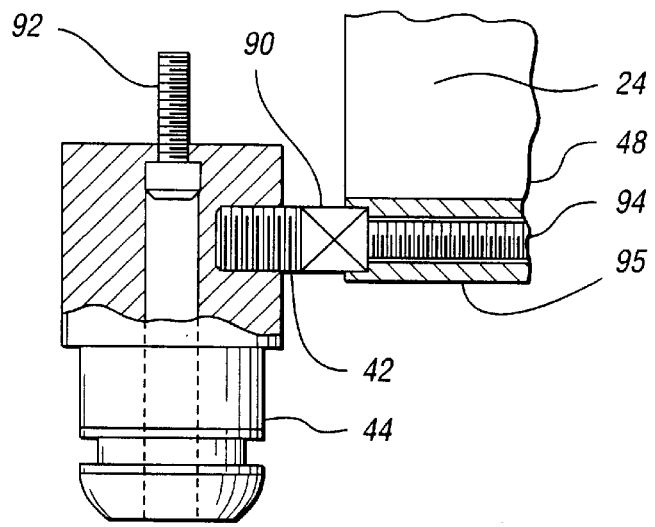
FIG. 3 is a fragmented elevational view of a latch bolt, a pin having a swivel, a threaded rod, and a copper tube for use with the present invention.
Figure 4:
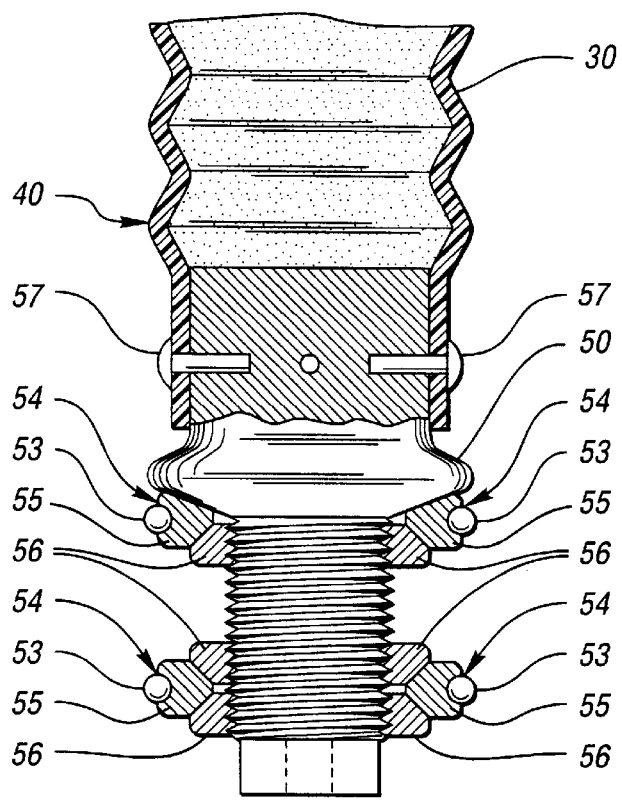
FIG. 4 is a cross-sectional elevational view of a deployable end of a bellows suitable for use with the present invention.
Figure 5:
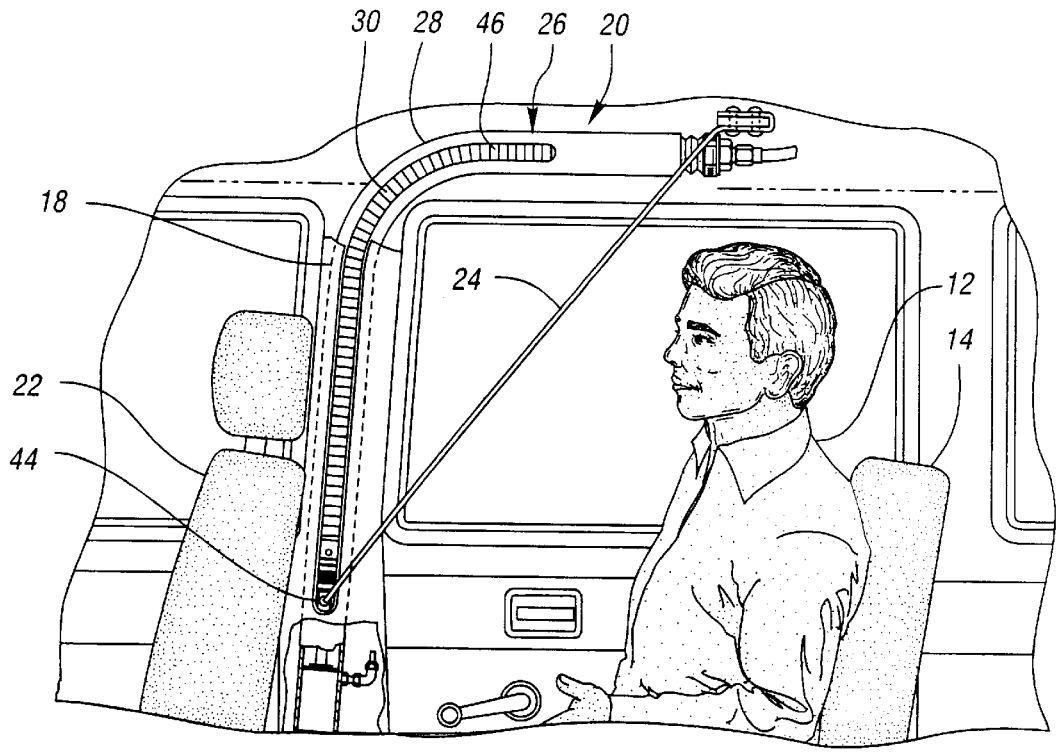
FIG. 5 is a cross-sectional elevational view of the vehicle shown in FIG. 1 with the restraint system shown in a fully deployed position.

The latch bolt 44 includes a pin 42 which is attached to a latch bolt 44 via a threaded connection as shown in FIG. 3. As shown in FIGS. 1, 2, and 5, the guide tube 28 includes a slot 46 so that the pin 42 may protrude from the latch bolt 44 outwardly of the guide tube 28. Outward of the guide tube 28, the pin 42 is attached to a second end 48 of crash barrier 24 thru barrier rod 94 and copper tubing 95. During deployment of the restraint system, slot 46 of the guide tube 28 guides pin 42 of the latch bolt 44, and accordingly the crash barrier from the retracted position to a fully deployed position.

As shown in FIG. 3, the pin 42 is preferably connected to a barrier rod 94 by way of a swivel 90. While any suitable swivel may be used, it is believed that a Flex Swivel Hose Nipple supplied by McMaster-Carr of Chicago, Ill. would be suitable. The connection between the swivel 90 and the pin 42, and between the swivel 90 and the barrier rod 94 may be mating threaded ends. Swivel 90 is preferably included to accommodate torsional movement between pin 42 and barrier rod 94 as crash barrier 24 is deployed from the retracted position to a fully deployed position. Copper tubing 95 extends across vehicle 10 from guide assembly 26 to the second guide assembly on the opposite side of the vehicle. Copper tubing 95 is inserted in a sleeve sewn in the second end 48 of crash barrier 24.

During deployment, the latch bolt 44 together with the head 52 must swivel to accommodate twisting of the bellows 30 with respect to guide tube 28 during expansion. To facilitate movement of head 50 within guide tube 28, the head 50 includes cycle bearings 54. Cycle bearings 54 including bearing balls 53 retained in an inner race 55 and bearing during expansion of the bellows 30 on guide tube 28. Each cycle bearing 54 is attached to head 50 with bearing retainer nuts 56 which are threaded onto a threaded portion of the head 50. Because such cycle bearings and retainer nuts are well known in the art, they will not be described in further detail here.

Figure 6:
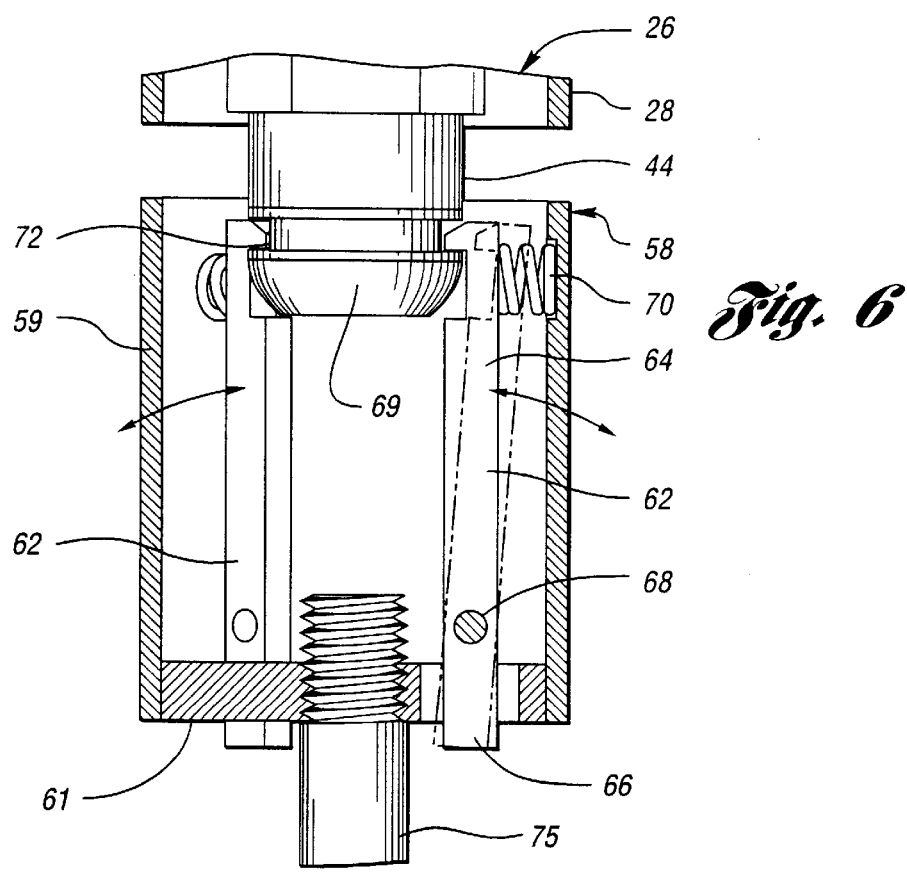
FIG. 6 is an elevational view of a guide assembly with a keeper tube assembly broken away to show a deployed latch bolt in a latched position with its keeper.

FIG. 5 shows the restraint system 20 of FIG. 1 in a fully deployed position. As shown in FIGS. 6 and 7, to maintain effectiveness of the restraint system 20 in the fully deployed position, latch bolt 44 must latch with a keeper assembly 58 which is also preferably used to further tauten the crash barrier 24. For this purpose the keeper assembly 58 includes a cylindrical housing 59 having a base 61 connectable with a tautening device 60.

In this embodiment, the locking mechanism on the inside of keeper assembly 58 includes a number of pawls 62, such as three, each having a head portion 64 and a bottom portion 66 extending through and beyond openings in the bottom surface of keeper base 61. Each pawl 62 is pivotable about a pivot pin 68 fixed with respect to the keeper housing 59 and is biased inwardly from the keeper housing 59 by a resilient device 70. While any suitable mechanism may be used, the resilient device 70 as shown may be a coil spring or the like. As latch bolt 44 is received into keeper assembly 58, each pawl 62 is cammed outwardly against resilient device 70 by the bullet-shaped nose 69 of latch bolt 44. As latch bolt 44 is received further in-o keeper assembly 58, the head 64 of each pawl 62 is biased by a respective resilient device 70 into a groove 72 of latch bolt 44. Latch bolt 44 may be released from keeper 58 by simultaneously pressing inwardly the bottom portion 66 of each pawl 62.

FIG. 7 is a cross-sectional view of guide assembly 26 with guide tube 28 and keeper housing 59 broken away to show latch bolt 44 and keeper pawls 62 together with a tautening device 60 there below. After latch bolt 44 latches with the pawls of keeper assembly 58, a tautening device 60 having a piston housing 63 may be employed to tauten the crash barrier 24. In this embodiment, tautening device 60 includes a piston 74 with an o-ring 73 and a resilient device 76. While any suitable mechanism may be used, the resilient device 76 as shown may be a coil spring or the like. Keeper assembly 58 is connected to piston 74 by a connecting rod 75 threaded on both ends and connected at its upper end to the base 61 of the keeper and at its lower end to the piston 74. Resilient device 76 biases keeper assembly 58 toward latch bolt 44. Once latch bolt 44 has been fully seated in keeper assembly 58, air pressure from a second supply line 78 may be used to fill the piston housing 63 above piston 74 pulling keeper assembly 58 and the latched bolt 44 in a direction away from guide tube 28 thereby tautening crash barrier 24. When the air pressure is released from tautening device 60, resilient device 76 forces piston 74 back to its spring-biased position. This moves the keeper assembly 58 toward the guide tube 28 so that the pawls 62 can be pivoted to release latch bolt 44. Crash barrier 24 can then be re-stowed above the headliner 16. While any suitable tautening device may be used, it is believed that a tautening device, part number 5302k-65, manufactured by Humphrey and supplied by Dupatie of Kalamazoo, Mich. may be suitable. The tautening device 60 may be attached to the sheet metal of vehicle 14 in any suitable manner, such as by welded brackets and bolts.

Restraint system 20 further requires a sensor to sense when vehicle 10 has been subjected to a high impact force. The sensor must be capable of providing activation to a pneumatic system to pressurize the bellows on each side of vehicle 10. One skill in the art will recognize that a variety of conventional sensors and activators may be utilized. Because such sensors and activators are well known in the art, they will not be described in further detail here.

FIG. 8 is a schematic of a pneumatic system suitable for use with the restraint system and referred to as expander. The pneumatic system includes a source 80 of pressurized gas, an impact sensor 81, a pressure switch 82, a gas valve 83 operated by a solenoid 84, and a gas valve 85 operated by a solenoid 86.

When vehicle 10 is subjected to a high impact force, gas source 80 receives an electrical signal from the sensor 81. This signal opens source 80 allowing gas pressure from source 80 to flow through valve 83 and into the bellows 30. Increasing gas pressure expands bellows 30 and forces the second end of bellows 30 from the retracted position to the fully deployed position. Once the gas pressure in bellows 30 reaches a specific level, such as 30 pounds per square inch, pressure switch 82 transmits a first signal to solenoid 84 to close valve 83 and a second signal to a solenoid 86 opening valve 85. At this time, gas pressure from gas source 80 is directed through valve 85 to second supply line 78 and into tautening device 60. Gas fills tautening device 60 forcing piston 74 downwardly and, thereby, tautening crash barrier 24. The pneumatic system includes a dump valve 88 to discharge the gas from the system. Dump valve 88 is manually opened to release gas pressure from each bellows 30 and tautening device 60 and, thereafter, crash barrier 24 may be re-stowed.

Although restraint system 20 has been shown in a partially deployed position, in practice deployment of the system occurs very quickly. Further, one skilled in the art will recognize that crash barrier 24 may include a zipper or like means to release passenger 12 after deployment of the system.

While embodiments of the invention have been illustrated and described, it is not intended that such disclosure illustrate and describe all possible forms of the invention. It is intended that the following claims cover all modifications and alternative designs, and all equivalents, that fall within the spirit and scope of this invention.

What is claimed is:

1. A protection system providing a crash barrier for an occupant of a vehicle having a header when said vehicle is subjected to an impact force, said protection system comprising:
   a pair of spaced expandable bellows adapted to be in normally retracted stored relationship to said header of said vehicle, each bellows having a first end affixed with respect to said vehicle on one side of the occupant and a second end expandably deployable to an opposite side of the occupant;
   a latch adapted to be affixed with respect to said vehicle at said opposite side of the occupant to latchingly receive said second end of at least one of the bellows;
   a crash barrier having one portion adapted to be affixed with respect to said vehicle on said one side of the occupant and another portion attached to said second end of each bellows and deployable with said second end to said opposite side of the occupant to provide the crash barrier;
   a sensor operable for sensing when said vehicle is subjected to a high impact force; and
   an expander responsive to operation of said sensor for expanding said bellows from said normally retracted stored relationship to deploy said second end of each bellows to said opposite side of said occupant and thereby deploy said crash barrier.

2. The protection system of claim 1 including a guide assembly for each of said expandable bellows.

3. The protection system of claim 2 wherein the guide assembly includes a guide tube.

4. The protection system of claim 2 wherein each of said expandable bellows is positioned within a respective guide assembly and each guide assembly includes a guide slot to provide access for attaching said crash barrier to said second end of a respective bellows and to guide said second end of said respective bellows from said normally retracted stored relationship to said opposite side of said occupant.

5. The protection system of claim 1 wherein said expander responsive to operation of said sensor for expanding said bellows includes a pneumatic supply filling said bellows with a gas and thereby forcing said second end of each bellows from said normally retracted stored relationship to said opposite side of said occupant when said sensor is operated.

6. The protection system of claim 1 wherein the second end of each bellows includes a latch bolt which is attached to said crash barrier and which is latchable with said latch.

7. The protection system of claim 6 wherein said latch include a keeper for receiving said latch bolt and a tautening device to tauten said crash barrier after said latch bolt has been received by said keeper.

8. The protection system of claim 7 wherein said tautening device includes a piston movable for moving said keeper to tauten said crash barrier after said latch bolt has been received by said keeper.

9. The protection system of claim 8 wherein said latch further includes a pneumatic supply to move said piston.

10. The protection system of claim 8 wherein said tautening device further includes a spring for biasing said keeper toward said latch bolt.

11. A crash barrier protection system for an occupant of a vehicle having a support structure and trim covering said support structure, the crash barrier protection system comprising:
   a pair of spaced guide tubes concealed by said trim;
   a pair of expandable bellows, each bellows positioned within a respective guide tube in normally retracted stored relationship to said support structure, each bellows having a first end affixed with respect to said support structure on one side of an occupant and a second end expandably deployable to an opposite side of an occupant in said vehicle;
   a latch affixed with respect to said vehicle at said opposite side of an occupant to receive latchingly said second end of at least one of the bellows;
   a crash barrier normally concealed by said trim and having one portion affixed with respect to said support structure on said one side of an occupant and another portion attached to said second end of each bellows and deployable with said second end to said opposite side of an occupant to provide the crash barrier;
   a sensor operable for sensing when said vehicle is subjected to a high impact force; and
   an expander responsive to operation of said sensor for expanding said bellows from said normally retracted stored relationship to deploy said second end of each bellows to said opposite side of an occupant and thereby deploy said crash barrier.

12. A method of protecting an occupant in a vehicle having a header when the vehicle is subjected to an impact force, said method comprising:
   providing an expandable bellows adapted to be in normally retracted stored relationship to the header of the vehicle, the bellows having a first end affixed with respect to the vehicle on one side of the occupant, and a second end;
   providing a crash barrier having one portion affixed with respect to the vehicle on the one side of the occupant and another portion attached to the second end of the bellows;
   storing the crash barrier in a normally retracted relationship to the header of the vehicle; and
   expanding the expandable bellows in response to an impact force to deploy the second end of the bellows to an opposite side of the occupant.

13. The method of claim 12 wherein two expandable bellows are used, each bellows having a first end affixed with respect to the vehicle on one side of the occupant and a second end attached to the crash barrier.

14. The method of claim 13 further comprising providing a latch at the opposite end of the occupant to latchingly receive the second end of at least one of the bellows after expanding the expandable bellows in response to an impact force to deploy the second end of the crash barrier to the opposite side of the occupant.

15. The method of claim 14 further comprising providing a tautening device at the opposite side of the occupant to tauten the crash barrier after the second end of at least one of the bellows has been received by the latch, said method further comprising providing a guide assembly comprising a pair of guide tubes for guiding each of the expandable bellows from the normally retracted stored relationship to the opposite side of the occupant.

16. A protection system providing a crash barrier for an occupant of a vehicle having a header when said vehicle is subjected to an impact force, said protection system comprising:
   an expandable bellows adapted to be in normally retracted stored relationship to said header of said vehicle, said bellows having a first end affixed with respect to said vehicle on one side of the occupant and a second end expandably deployable to an opposite side of the occupant;

a latch adapted to be affixed with respect to said vehicle at said opposite side of the occupant to latchingly receive said second end of said bellows;

a crash barrier having one portion adapted to be affixed with respect to said vehicle on said one side of the occupant and another portion attached to said second end of said bellows and deployable with said second end to said opposite side of the occupant to provide the crash barrier;

a sensor operable for sensing when said vehicle is subjected to an impact force; and an expander responsive to operation of said sensor for expanding said bellows from said normally retracted stored relationship to deploy said second end of said bellows to said opposite side of said occupant and thereby deploy said crash barrier.

17. A crash barrier protection system for an occupant of a vehicle having a support structure and trim covering said support structure, the crash barrier protection system comprising:

a guide tube concealed by said trim;

an expandable bellows positioned within said guide tube in normally retracted stored relationship to said support structure, said bellows having a first end affixed with respect to said support structure on one side of an occupant and a second end expandably deployable to an opposite side of art occupant in said vehicle;

a latch affixed with respect to said vehicle at said opposite side of an occupant to receive latchingly said second end of said bellows;

a crash barrier normally concealed by said trim and having one portion affixed with respect to said support structure on said one side of an occupant and another portion attached to said second end of said bellows and deployable with said second end to said opposite side of an occupant to provide the crash barrier;

a sensor operable for sensing when said vehicle is subjected to an impact force; and an expander responsive to operation of said sensor for expanding said bellows from said normally retracted stored relationship to deploy said second end of said bellows to said opposite side of an occupant and thereby deploy said crash barrier.

18. A method of protecting an occupant in a vehicle having a header when the vehicle is subjected to an impact force, said method comprising:

storing a crash barrier in a normally retracted relationship to the header of the vehicle, the crash barrier having a first end affixed with respect to the vehicle on one side of the occupant, and a second end;

deploying the second end of the crash barrier to an opposite side of the occupant in response to an impact force on the vehicle;

latching the second end of the crash barrier at the opposite side of the occupant; and tautening the crash barrier after the second end of the crash barrier has been latched, wherein a latch is provided for latching the second end of the crash barrier and a tautening device is provided for tautening the crash barrier.

19. The method of claim 18 wherein the tautening device includes a movable piston, and said method further comprising filling the tautening device with gas from a gas supply to move the piston in a direction away from the first end of the crash barrier.

20. A method of protecting an occupant in a vehicle having a header when the vehicle is subjected to an impact force, said method comprising:

storing a crash barrier in a normally retracted relationship to the header of the vehicle, the crash barrier having a first end affixed with respect to the vehicle on one side of the occupant, and a second end;

moving the second end of the crash barrier a first distance to an opposite side of the occupant in response to an impact force on the vehicle to latch the second end of the crash barrier at the opposite side of the occupant; and moving the second end of the crash barrier a second distance, different from the first distance, to tauten the crash barrier after the second end of the crash barrier has been latched.

* * * * *